United States Patent
Kim et al.

(10) Patent No.: US 10,782,915 B2
(45) Date of Patent: Sep. 22, 2020

(54) DEVICE CONTROLLER THAT SCHEDULES MEMORY ACCESS TO A HOST MEMORY, AND STORAGE DEVICE INCLUDING THE SAME

(71) Applicant: SAMSUNG ELECTRONICS CO., LTD., Suwon-si, Gyeonggi-do (KR)

(72) Inventors: Seon-Bong Kim, Suwon-si (KR); Jun-Young Jang, Seoul (KR); Jong-Hwan Kim, Suwon-si (KR); Ho-Jun Shim, Yongin-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 16/058,197

(22) Filed: Aug. 8, 2018

(65) Prior Publication Data
US 2019/0155545 A1    May 23, 2019

(30) Foreign Application Priority Data
Nov. 20, 2017 (KR) .......................... 10-2017-0155116

(51) Int. Cl.
G06F 3/06 (2006.01)

(52) U.S. Cl.
CPC .......... *G06F 3/0659* (2013.01); *G06F 3/0611* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 8,341,332 B2 | 12/2012 | Ma et al. | |
| 8,341,374 B2 | 12/2012 | Kwon et al. | |
| 2006/0104269 A1* | 5/2006 | Perozo | G06F 3/0613 370/389 |
| 2010/0325384 A1* | 12/2010 | Ryu | G06F 3/0611 711/209 |
| 2012/0260032 A1* | 10/2012 | Chiu | G06F 13/1626 711/105 |
| 2013/0339583 A1 | 12/2013 | Shin et al. | |
| 2015/0074360 A1 | 3/2015 | Lee | |
| 2016/0026388 A1* | 1/2016 | Jeong | G06F 3/061 711/103 |
| 2016/0062669 A1 | 3/2016 | Chu et al. | |

(Continued)

*Primary Examiner* — Charles Rones
*Assistant Examiner* — Jonah C Krieger
(74) *Attorney, Agent, or Firm* — F. Chau & Associates, LLC

(57) ABSTRACT

A device controller included in a storage device includes a host controller connected to a host memory, a memory controller connected to a plurality of nonvolatile memory devices, a protocol controller configured to control data transfer between the host controller and the plurality of nonvolatile memory devices, and to perform data memory access to a data region of the host memory and non-data memory access to a non-data region of the host memory through the host controller, and a scheduler configured to re-order the data memory access and the non-data memory access such that the non-data memory access to the non-data region is performed after the data memory access to a data chunk has completed, the data chunk being successive data that is allocated within the data region by a physical region page (PRP).

20 Claims, 8 Drawing Sheets

(56) References Cited

U.S. PATENT DOCUMENTS

| | | |
|---|---|---|
| 2016/0162186 A1 | 6/2016 | Kashyap et al. |
| 2017/0052895 A1 | 2/2017 | Yang et al. |
| 2017/0075834 A1 | 3/2017 | Cha et al. |
| 2018/0321864 A1* | 11/2018 | Benisty ................ G06F 3/0625 |

* cited by examiner

DEVICE CONTROLLER THAT SCHEDULES MEMORY ACCESS TO A HOST MEMORY, AND STORAGE DEVICE INCLUDING THE SAME

CROSS-REFERENCE TO RELATED APPLICATIONS

This U.S. non-provisional application claims the benefit of priority under 35 U.S.C. § 119 to Korean Patent Application No. 10-2017-0155116 filed on Nov. 20, 2017 in the Korean Intellectual Property Office (KIPO), the disclosure of which is incorporated by reference in its entirety herein.

BACKGROUND

1. Technical Field

Exemplary embodiments of the present inventive concept relate to storage devices, and more particularly to device controllers that schedules memory access to host memories, and storage devices including the device controllers.

2. Discussion of Related Art

A conventional storage device, such as a serial advanced technology attachment (SATA) or serial-attached small computer system interface (SAS) solid state drive (SSD) is connected to a host via a host bus adapter (HBA) in order to receive commands and data through the HBA. Recently, a nonvolatile memory express (NVMe) interface has been developed as a more suitable interface for the SSD. An NVMe SSD employing the NVMe interface may be directly connected to a host bus. Thus the host directly accesses the NVMe SSD. However, the NVMe SSD accesses memory in manner that results in a lower than desirable hit ratio and throughput efficiency.

SUMMARY

At least one exemplary embodiment of the inventive concept provides a device controller that schedules memory access to a host memory.

At least one exemplary embodiment of the inventive concept provides a storage device including a device controller that schedules memory access to a host memory.

According to an exemplary embodiment of the inventive concept, a device controller included in a storage device includes a host controller connected to a host memory, and configured to communicate with the host memory, a memory controller connected to a plurality of nonvolatile memory devices, and configured to communicate with the plurality of nonvolatile memory devices, a protocol controller configured to control data transfer between the host controller and the plurality of nonvolatile memory devices, and to perform data memory access to a data region of the host memory and non-data memory access to a non-data region of the host memory through the host controller, and a scheduler configured to re-order the data memory access and the non-data memory access such that the non-data memory access to the non-data region is performed after the data memory access to a data chunk has completed, the data chunk being successive data that is allocated within the data region by a physical region page (PRP).

According to an exemplary embodiment of the inventive concept, a device controller included in a storage device includes a host controller connected to a host memory, and configured to communicate with the host memory a memory controller connected to a plurality of nonvolatile memory devices, and configured to communicate with the plurality of nonvolatile memory devices, a protocol controller configured to control data transfer between the host controller and the plurality of nonvolatile memory devices, and to perform a data memory access to a data region of the host memory and a non-data memory access to a non-data region of the host memory through the host controller, and a scheduler configured to selectively perform re-ordering of the data memory access and the non-data memory access according to a number of outstanding commands and throughput efficiency of the plurality of nonvolatile memory devices.

According to an exemplary embodiment of the inventive concept, a storage device includes a plurality of nonvolatile memory devices, and a device controller configured to control the plurality of nonvolatile memory devices. The device controller includes a host controller connected to a host memory, and configured to communicate with the host memory, a memory controller connected to the plurality of nonvolatile memory devices, and configured to communicate with the plurality of nonvolatile memory devices, a protocol controller configured to control data transfer between the host controller and the plurality of nonvolatile memory devices, and to perform data memory access to a data region of the host memory and non-data memory access to a non-data region of the host memory through the host controller, and a scheduler configured to re-order the data memory access and the non-data memory access such that the non-data memory access to the non-data region is performed after the data memory access to a data chunk has completed, the data chunk being successive data that is allocated within the data region by a physical region page (PRP).

According to an exemplary embodiment of the inventive concept, a storage device includes a device controller and a plurality of nonvolatile memory devices. The device controller is configured to perform one of i) accessing a non-data region of a host memory of a host device before the device controller has finished accessing a data chunk in a data region of the host memory and ii) accessing the non-data region while the device controller is accessing the data chunk, according to a condition. The data chunk is successive data that is allocated within the data region by a physical page region (PRP). The accessing of the data chunk is performed as part of executing a first command on one of the nonvolatile memory devices.

As described above, the device controller and the storage device according to at least one embodiment of the inventive concept re-orders a data memory access and a non-data memory access such that the non-data memory access to a non-data region of a host memory is performed after the data memory access to a data chunk within a data region of the host memory has completed, thereby improving a hit ratio of a row buffer of the host memory.

Further, the device controller and the storage device according to at least one embodiment of the inventive concept selectively performs the re-ordering of the data memory access and the non-data memory access according to the number of outstanding commands and/or throughput efficiency of nonvolatile memory devices, thereby improving the hit ratio of the row buffer of the host memory while maintaining throughput efficiency of the storage device.

BRIEF DESCRIPTION OF THE DRAWINGS

Exemplary embodiments of the inventive concept will be more clearly understood from the following detailed description taken in conjunction with the accompanying drawings.

DETAILED DESCRIPTION OF THE EXEMPLARY EMBODIMENTS

Figure 1:
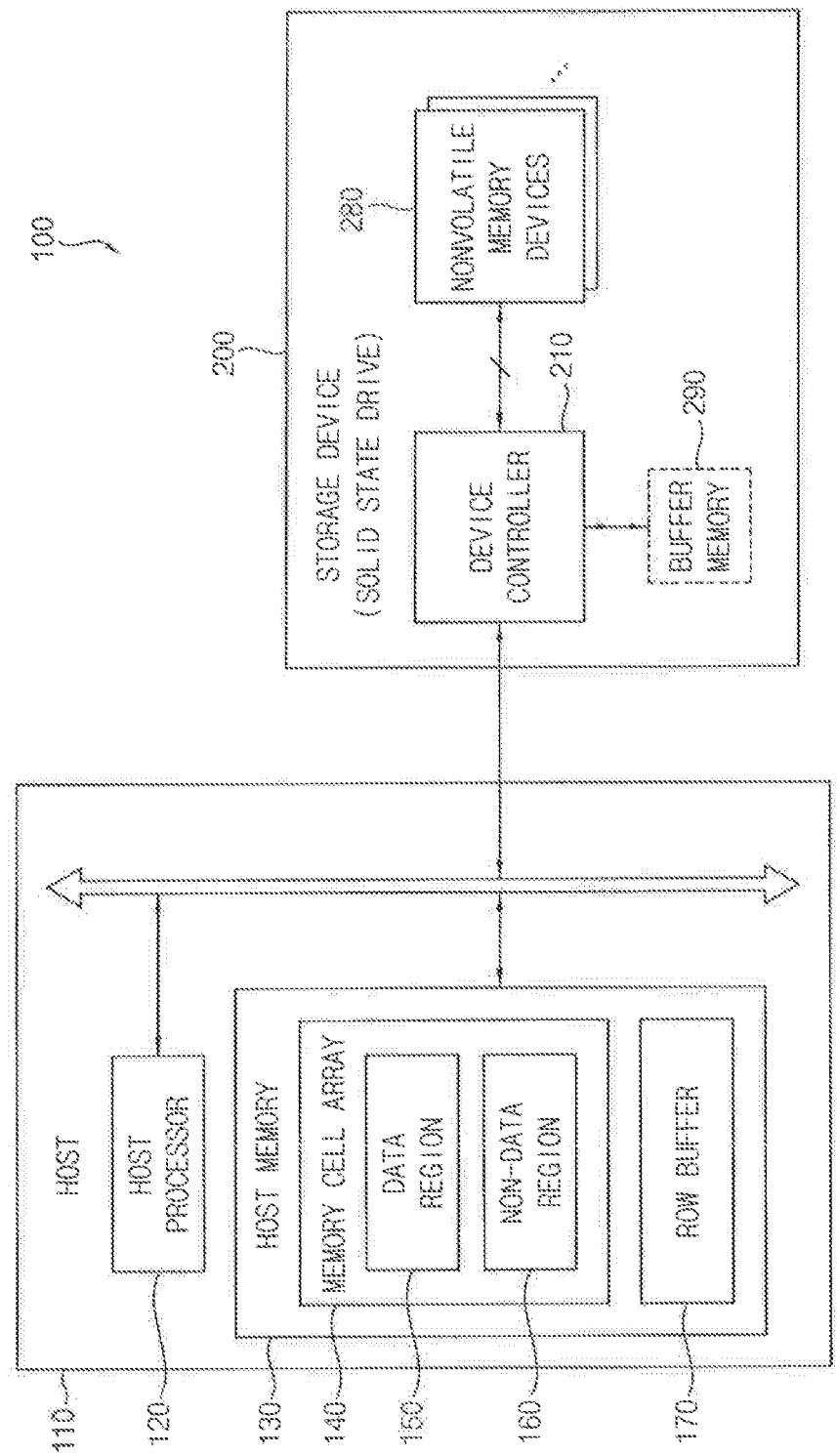
FIG. 1 is a block diagram illustrating a computing system including a storage device according to an exemplary embodiment of the inventive concept.
Figure 2:
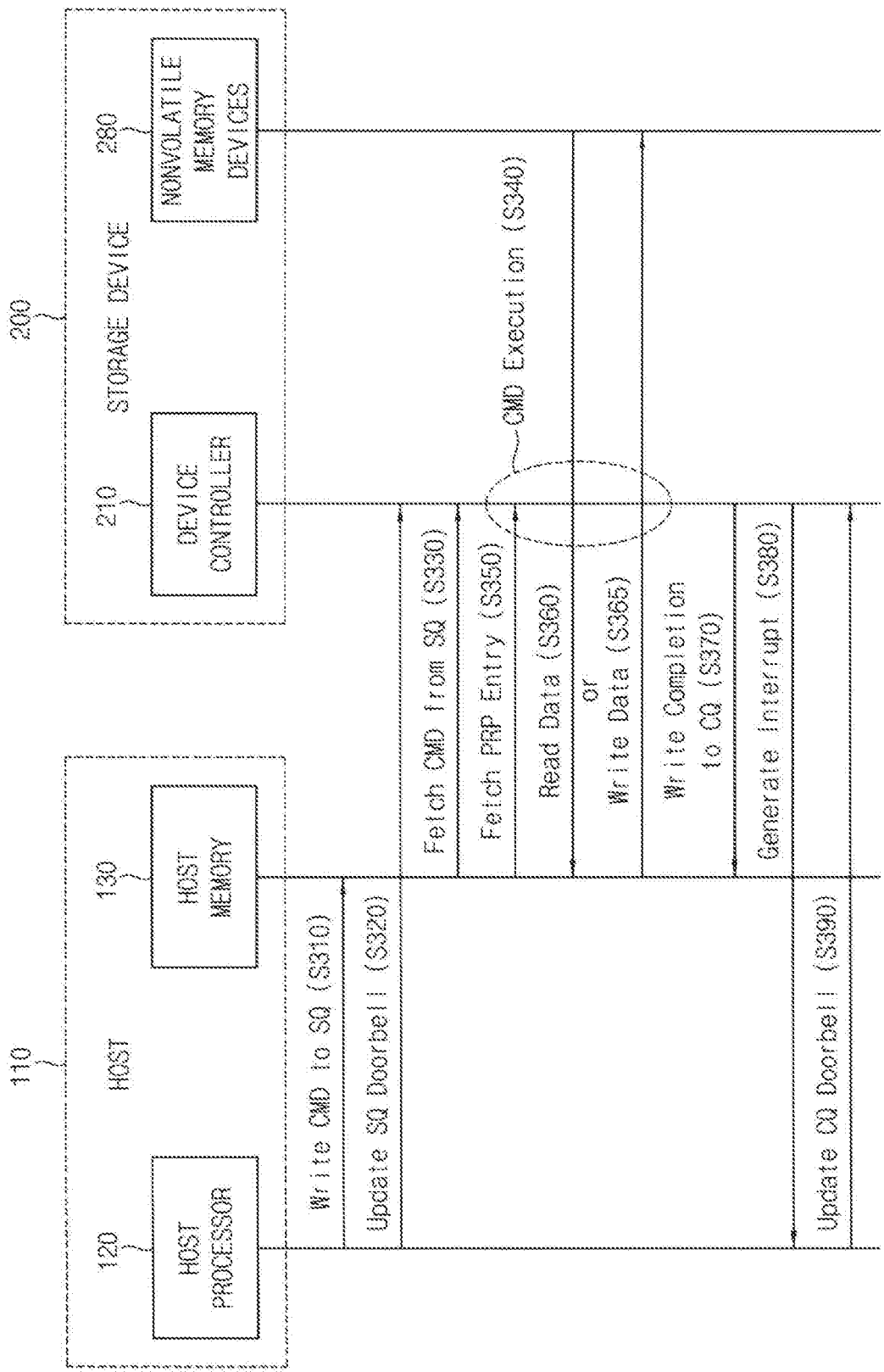
FIG. 2 is a diagram for describing an example of command processing in a computing system including a storage device according to an exemplary embodiment of the inventive concept.

FIG. 1 is a block diagram illustrating a computing system including a storage device according to an exemplary embodiment of the inventive concept, and FIG. 2 is a diagram for describing an example of command processing in a computing system including a storage device according to an exemplary embodiment of the inventive concept.

Referring to FIG. 1, a computing system 100 includes a host 110 (e.g., a host device) that generates data access (e.g., read and write) requests, and a storage device 200 that performs data read and write operations in response to the data read and write requests. A data read request is a request (e.g., a read command) from the host 110 to read data from the storage device 200 and a data write request (e.g., a write command) is a request from the host 110 to write data to the storage device 200. In some example embodiments, the computing system 100 may be any electronic device, such as a personal computer (PC), a laptop computer, a server computer, a workstation, a cellular phone, a smart phone, a tablet computer, an MP3 player, personal digital assistants (PDA), a portable multimedia player (PMP), a digital television (TV), a digital camera, or a portable game console.

The host 110 includes a host processor 120 and a host memory 130. The host processor 120 may control overall operations of the host 110 or the computing system 100. In an exemplary embodiment, the host processor 120 is a central processing unit (CPU), a microprocessor, or an application processor (AP). The host processor 120 (or host software executed by the host processor 120) may write commands that request the data read and write operations of the storage device 200 to the host memory 130 (e.g., a non-data region 160 of the host memory 130). For example, the host processor 120 may generate a write command to write data to the storage device 200, generate a read command to read data from the storage device, and store the read and/or the write commands in the non-data region 160.

The host memory 130 may be a system memory of the computing system 100, and may store instructions and data that are executed and processed by the host processor 120.

In some example embodiments, the host memory 130 may be implemented with, but is not limited to, a volatile memory device, such as a static random access memory (SRAM) device or a dynamic random access memory (DRAM) device. The host memory 130 includes a memory cell array 140 that includes a plurality of memory cells arranged in a matrix form (e.g., in rows and columns), and a row buffer 170 that temporally stores data read from the memory cell array 140 or written to the memory cell array 140. For example, the row buffer 170 may store data of one of the rows. A portion of the memory cell array 140 is used as a data region 150 for the storage device 200, and another portion of the memory cell array 140 is used as a non-data region 160 for the storage device 200. In an exemplary embodiment, the data region 150 is a region allocated within the host memory 130 to store data (e.g., user data) read from the storage device 200 or to store data (e.g., user data) to be written to the storage device 200. In this embodiment, the non-data region 160 is another region allocated within the host memory 130 to store control information for the storage device 200. In some example embodiments, the non-data region 160 may include, but is not limited to, a submission queue (SQ) region in which one or more commands to be executed by the storage device 200 are stored, a physical region page (PRP) region in which address information of a PRP or a data chunk allocated within the data region 150 is stored, and a completion queue (CQ) region in which completion information indicating whether execution of the command has completed is stored. Each of SQ and CQ may be a circular buffer, one or more SQs and one CQ may form one set or pair, and one or more pairs of the SQs and CQs may be stored in the non-data region 160. The SQ region includes a queue (e.g., a command queue) storing commands that are to be executed at a future time. In an exemplary embodiment, the data chunk is data or a unit of data (or a data memory region) successively allocated within the data region by one PRP. For example, the data chunk is data stored in consecutive locations of the data region 150. The data chunk may be used as a region in which data (e.g., user data) to be read from the storage device 200 are stored, or may contain data (e.g., user data) to be written to the storage device 200. In an example, each data chunk has a size of about 4 KB, but is not limited thereto. In an exemplary embodiment, the non-data region 160 further includes a host memory buffer (HMB) region used by the storage device 200.

The storage device 200 includes a plurality of nonvolatile memory devices 280, and a device controller 210 that controls the plurality of nonvolatile memory devices 280. In an exemplary embodiment, the storage device 200 further includes a buffer memory 290 located inside or outside the device controller 210. In an exemplary embodiment, the storage device 200 is a solid state drive (SSD). In some example embodiments, the plurality of nonvolatile memory devices 280 may be, but are not limited to, flash memory devices, phase-change random access memory (PRAM), a magnetic random access memory (MRAM), a resistive random access memory (RRAM), a ferroelectric random access memory (FRAM), or a combination thereof. The device controller 210 may read commands including data read and write requests from the host memory 130, and may control the storage device 200 to perform data read and write operations in response to the commands read from the host memory 130.

The device controller 210 may perform a non-data memory access to the non-data region 160 of the host memory 130, for example, to read the command from the host memory 130, to read address information of a data chunk within the data region 150 from the host memory 130, or to write completion information (e.g., information indicating that execution of command has completed) to the host memory 130. Further, the device controller 210 may perform a data memory access to the data region 150 of the host memory 130, for example, to write data read from the nonvolatile memory devices 280 to a data chunk within the data region 150, or to read data from a data chunk within the data region 150 to write the read data to the nonvolatile memory devices 280. The device controller 210 according to an exemplary embodiment of the inventive concept re-orders the data memory access and the non-data memory access such that the non-data memory access to the non-data region 160 is performed after the data memory access to the data chunk being successive data that is allocated within the data region by the PRP has completed. That is, the device controller 210 may delay the non-data memory access to the non-data region 160 until the data memory access to the data chunk has completed. For example, if the device controller 210 is initially scheduled to read a first part of the data chunk from the data region 150 at time 1, read an address from the non-data region at time 2, and then read the last part of the data chunk from the data region 150 at time 3, the device controller 210 re-orders these reads to read the last part of the data chunk at time 2 and read the address at time 3. Accordingly, since the data memory access to the data chunk that is successive data is continuously performed without interruption, a hit ratio of the row buffer 170 that serves as a cache of the host memory 130 may be improved. In an embodiment, the hit ratio of a cache is the fraction of accesses over a given period of time which are hit as opposed to a miss. For example, a hit occurs if the host 110 attempts to access certain data in the row buffer 170 and it is able to retrieve the certain data from the row buffer 170, and a miss occurs if the host 110 attempts to access the certain data in the row buffer 170 and it is not able to retrieve the certain data. When the miss occurs, the certain data may be present in the storage device 200. In an exemplary embodiment of the inventive concept, the device controller 210 selectively performs the re-ordering of the data memory access and the non-data memory access according to the number of outstanding commands stored in the SQ region and/or throughput efficiency of the nonvolatile memory devices 280. Accordingly, the device controller 210 according to exemplary embodiments may improve the hit ratio of the row buffer 170 of the host memory 130 while maintaining throughput efficiency of the storage device 200.

Hereinafter, an example of command processing in the computing system 100 including the storage device 200 according to an exemplary embodiment of the inventive concept will be described below with reference to FIGS. 1 and 2.

Referring to FIGS. 1 and 2, the host processor 120 (or the host software executed by the host processor 120) writes at least one command that requests a data read operation or a data write operation of the storage device 200 to the host memory 130 (S310). In an exemplary embodiment, the host processor 120 writes the command for the storage device 200 into the SQ region of the non-data region 160 of the host memory 130.

The host processor 120 updates an SQ doorbell of the storage device 200 to inform the storage device 200 that the command to be processed has been written in the SQ region (S320). In an exemplary embodiment, the device controller 210 of the storage device 200 includes an SQ tail doorbell register that stores a pointer to the last one of the commands stored in the SQ that is a circular buffer, and, after the host processor 120 appends the at least one command to the last one of the commands in the SQ, the host processor 120 updates the pointer in the SQ tail doorbell register to a value indicating the appended command.

The device controller 210 of the storage device 200 fetches the command from the SQ region of the host memory 130 (S330), and executes the fetched command (S340). For example, in a case where the fetched command is a data read command, the device controller 210 fetches a PRP entry (or address information of a data chunk in which data read from the nonvolatile memory devices 280 are to be stored) from the PRP region of the non-data region 160 of the host memory 130 (S350), reads data from the nonvolatile memory devices 280 in response to the fetched command, and writes the read data to the data chunk within the data region 150 indicated by the PRP entry (S360). For example, the PRP entry may indicate the location of the data chunk within the data region 150. In another example, in a case where the fetched command is a data write command, the device controller 210 fetches a PRP entry (or address information of a data chunk in which data to be written to the nonvolatile memory devices 280 are stored) from the PRP region of the non-data region 160 of the host memory 130 (S350), reads data from the data chunk within the data region 150 indicated by the PRP entry in response to the fetched command, and writes the data read from the data chunk to the nonvolatile memory devices 280 (S365). For example, the PRP entry may indicate the location of the data chunk within the data region 150.

If the data read operation (S360) or the data write operation (S365) corresponding to the fetched command has completed, the device controller 210 of the storage device 200 writes completion information indicating that the fetched command has completed to the CQ region of the host memory 130 (S370). For example, the device controller 210 may write the completion information into the next free slot within the CQ that is a circular buffer. In an exemplary embodiment, the device controller 210 optionally generates an interrupt to inform the host 110 that new completion information has been written in the CQ (S380). For example, the interrupt may include, but is not limited to, a message signaled interrupt (MSI)-X (or multiple message MSI), a pin-based interrupt, or a single message MSI. MSI permits a device to allocate 1, 2, 4, 8, 16, or 32 interrupts. The device may be programmed with an address to write to (e.g., a control register), and a 16-bit data word to identify it. MSI-X permits a larger number of interrupts (e.g., up to 2048) and gives each one a separate target address and data word.

If the completion information has been written into the CQ, or if the interrupt is received after the completion information has been written, the host processor 120 processes (e.g., error processing) the completion information, and updates a CQ doorbell of the storage device 200 to inform the storage device 200 that the completion information has been consumed (S390). In an exemplary embodiment, the device controller 210 of the storage device 200 includes a CQ head doorbell register that stores a pointer to the first one of the completion information stored in the CQ that is a circular buffer, and, after the host processor 120 sequentially processes at least one of the completion information in the CQ, the host processor 120 updates the pointer in the CQ head doorbell register to a value indicating a first one of unprocessed completion information. For example, when the host 110 consumes the completion information corresponding to a read request, the host 110 can conclude that the corresponding read data is located in the data region

150. For example, when the host 110 consumes the completion information corresponding to a write request, the host 110 can conclude that one or more of the nonvolatile memory devices 280 has been written with the corresponding write data.

The device controller 210 could have a worse hit ratio if it were to perform a data read operation or a data write operation for a data chunk successively allocated within the data region 150 using one PRP in response to a command while performing an SQ fetch or a CQ update for another command. Accordingly, to complete the data read operation or the data write operation for the data chunk, read operations from a memory cell array 140 to a row buffer 170 or write operations from the row buffer 170 to the memory cell array 140 are performed a plurality of times. However, the storage device 200 according to at least one embodiment of the inventive concept re-orders the data memory access and the non-data memory access such that the non-data memory access to the non-data region 160 is performed after the data memory access to a data chunk that is successive data allocated within the data region 150 using one PRP has completed, thereby improving the hit ratio of the row buffer 170 of the host memory 130. Further, in an exemplary embodiment of the inventive concept, the device controller 200 selectively performs the re-ordering of the data memory access and the non-data memory access according to the number of outstanding commands and/or the throughput efficiency of nonvolatile memory devices 280, thereby improving the hit ratio of the row buffer 170 of the host memory 130 while maintaining the throughput efficiency of the storage device 200.

Figure 3:
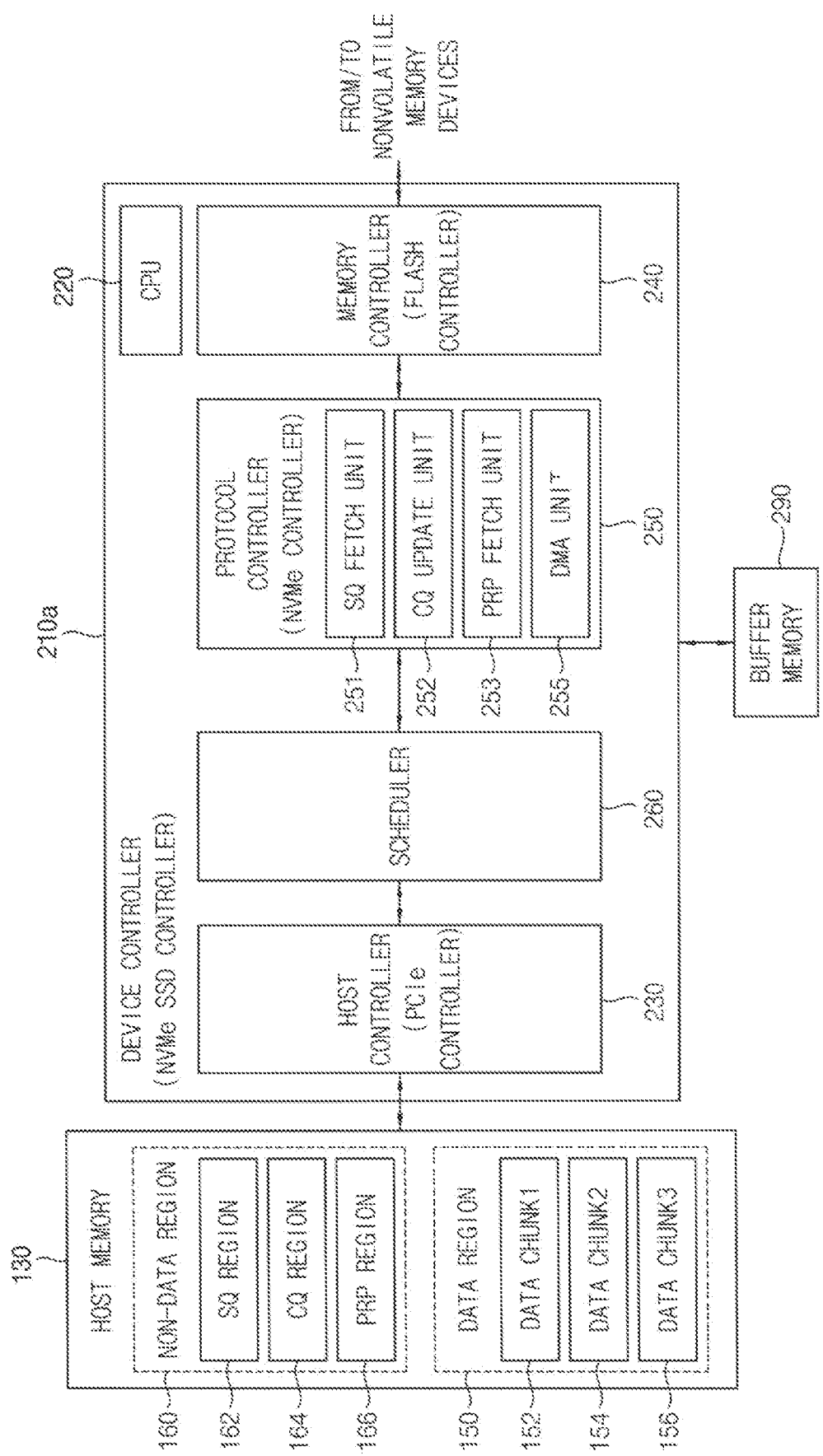
FIG. 3 is a block diagram illustrating a device controller of a storage device according to an exemplary embodiment of the inventive concept.
Figure 4:
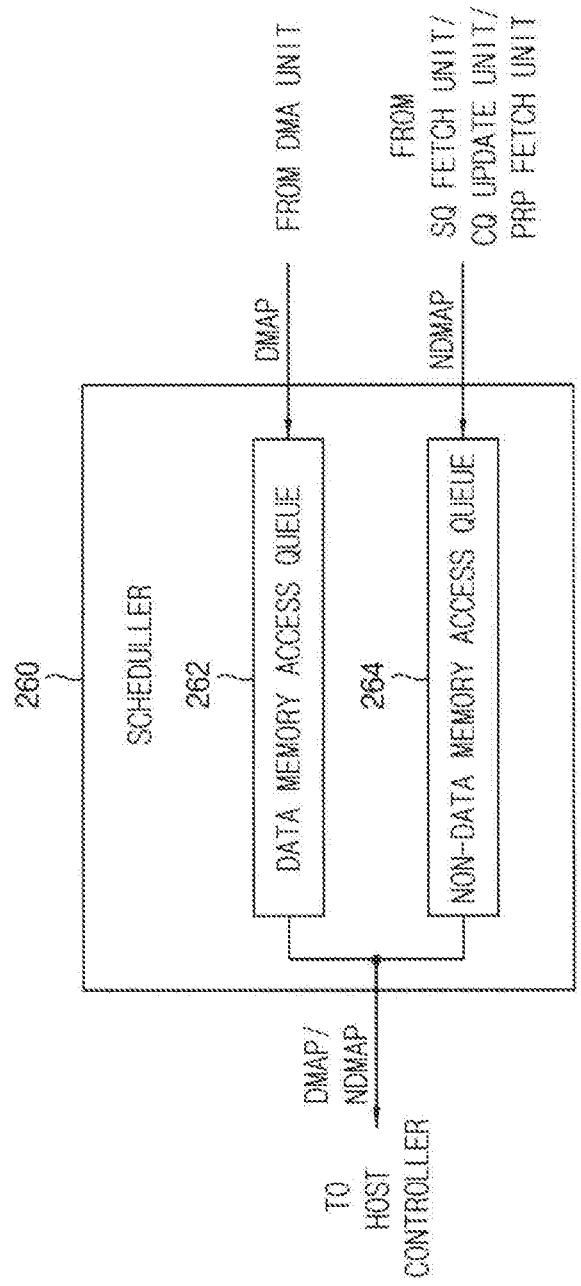
FIG. 4 is a block diagram illustrating a scheduler included in a device controller according to an exemplary embodiment of the inventive concept.
Figure 5:
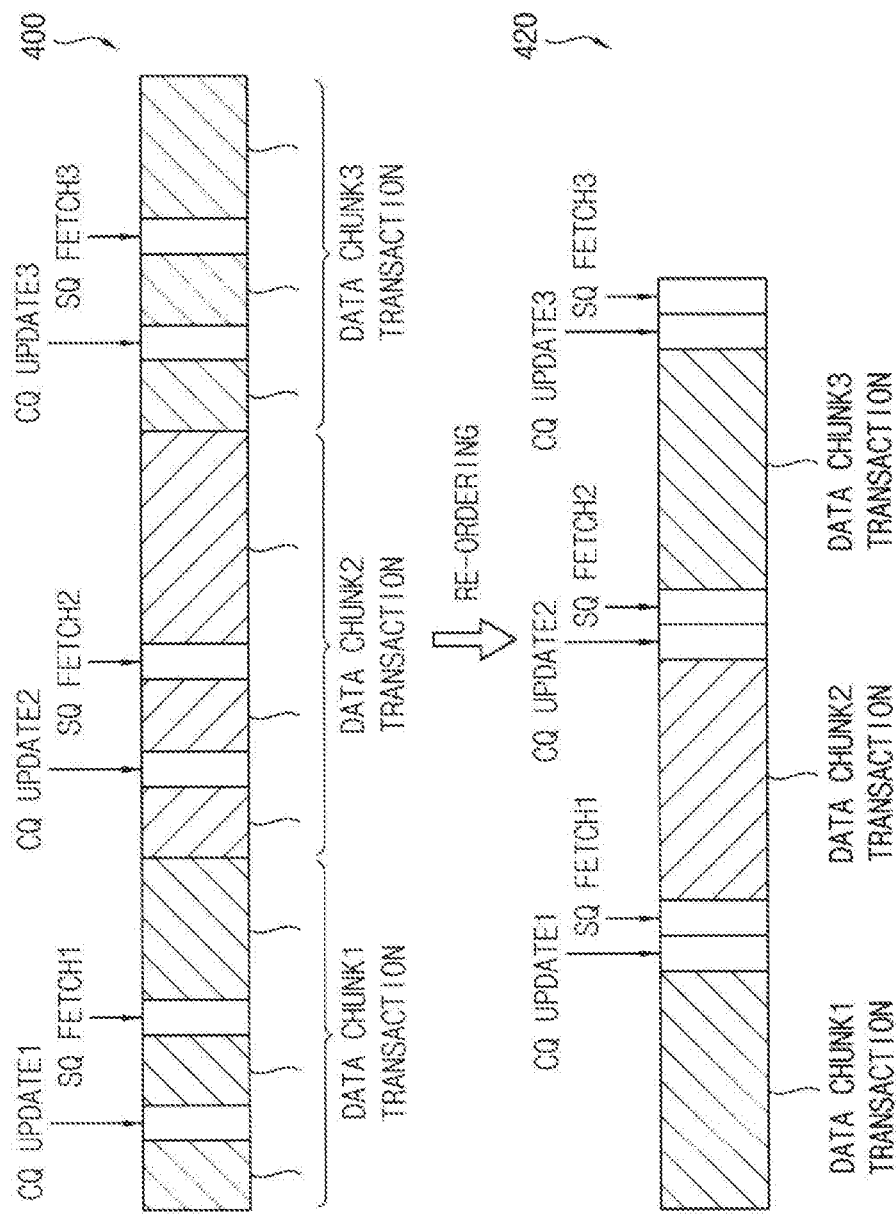
FIG. 5 is a diagram for describing an example where a device controller re-orders host memory accesses according to an example embodiments.

FIG. 3 is a block diagram illustrating a device controller of a storage device according to an exemplary embodiment of the inventive concept. FIG. 4 is a block diagram illustrating a scheduler included in a device controller according to an exemplary embodiment of the inventive concept. FIG. 5 is a diagram for describing an example where a device controller re-orders host memory accesses according to an exemplary embodiment of the inventive concept.

Referring to FIG. 3, a device controller 210*a* of a storage device according to an exemplary embodiment of the inventive concept includes a central processing unit (CPU) 220 that controls an overall operation of the device controller 210*a*, a host controller 230 connected to a host memory 130, a memory controller 240 connected to a plurality of nonvolatile memory devices, a protocol controller 250 that controls data transfer between the host memory 130 and the plurality of nonvolatile memory devices, and a scheduler 260 (e.g., a scheduling circuit) that re-orders a data memory access to a data region 150 of the host memory 130 and a non-data memory access to a non-data region 160 of the host memory 130.

The host controller 230 communicates with the host memory 130. In an exemplary embodiment, the host controller 230 is directly (or without a host bus adapter (HBA) between the storage device and a host) connected to the host memory 130 via a host bus. In an exemplary embodiment of the inventive concept, the host controller 230 is a peripheral component interconnect express (PCIe) controller that is connected to the host memory 130 through a PCIe bus.

The memory controller 240 communicates with the plurality of nonvolatile memory devices. In an exemplary embodiment of the inventive concept, the plurality of nonvolatile memory devices are flash memory devices, and the memory controller 240 is a flash controller. Further, in an exemplary embodiment of the inventive concept, the memory controller 240 is connected to the plurality of nonvolatile memory devices through a plurality of memory channels, and may be connected to two or more nonvolatile memory devices per memory channel. For example, the memory controller 240 may be connected to eight memory channels, where each memory channel is connected to eight nonvolatile memory devices. However, the number of the memory channels and the number of nonvolatile memory devices are not limited thereto.

The protocol controller 250 allows the device controller 210 to communicate with a host using a predetermined protocol. In an exemplary embodiment of the inventive concept, the protocol controller 250 is a nonvolatile memory express (NVMe) controller that allows the device controller 210 to communicate with the host in a NVMe protocol through the host controller 230 (e.g., the PCIe controller). In an embodiment, the protocol controller 250 performs a data memory access to the data region 150 of the host memory 130 and the non-data memory access to the non-data region 160 of the host memory 130.

In an exemplary embodiment of the inventive concept, the protocol controller 250 includes an SQ fetch unit 251 (e.g., a circuit) that performs an SQ fetch as the non-data memory access, a CQ update unit 252 (e.g., a circuit) that performs a CQ update as the non-data memory access, a PRP fetch unit 253 (e.g., a circuit) that performs a PRP fetch as the non-data memory access, and a direct memory access (DMA) unit 255 (e.g., a circuit or DMA controller) that performs the data memory access. The SQ fetch unit 251 performs the SQ fetch that fetches a command from an SQ region 162 of the non-data region 160. The PRP fetch unit 253 performs the PRP fetch that fetches a PRP entry, or address information of at least one of data chunks 152, 154 and 156 allocated within the data region 150 from a PRP region 166 of the non-data region 160. The DMA unit 255 performs the data memory access that writes data read from the nonvolatile memory devices to the data chunk 152, 154 and 156 in response to the fetched command, or reads data to be written to the nonvolatile memory devices from the data chunk 152, 154 and 156 in response to the fetched command. For example, in a case where the command fetched by the SQ fetch unit 251 is a data read command, and the PRP entry fetched by the PRP fetch unit 253 indicates a first data chunk 152, the DMA unit 255 writes data read from the nonvolatile memory devices to the first data chunk 152. In another example, in a case where the command fetched by the SQ fetch unit 251 is a data write command, and the PRP entry fetched by the PRP fetch unit 253 indicates a second data chunk 154, the DMA unit 255 reads data to be written to the nonvolatile memory devices from the second data chunk 154. Once processing of the fetched command has completed, the CQ update unit 252 performs the CQ update that writes completion information indicating the completion of processing of the fetched command to a CQ region 164 of the non-data region 160.

The scheduler 260 schedules the data memory access and the non-data memory access (e.g., the SQ fetch, the PRP fetch and the CQ update). For example, the scheduler 260 re-orders the data memory access and the non-data memory access such that the non-data memory access to the non-data region 160 is performed after the data memory access to each data chunk 152, 154 and 156 allocated within the data region 150 by one PRP has completed. For example, in a case where the re-ordering is not performed, as indicated by 400 in FIG. 5, a first CQ update and a first SQ fetch are performed while a data memory access to a first data chunk 152 is performed, a second CQ update and a second SQ fetch are performed while a data memory access to a second data chunk 154 is performed, and a third CQ update and a third SQ fetch are performed while a data memory access to a third data chunk 156 is performed. However, the scheduler 260 of the device controller 210a according to an exemplary embodiment of the inventive concept re-orders the data memory access and the non-data memory access such that, as indicated by 420 in FIG. 5, the first CQ update and the first SQ fetch are performed after the data memory access to the first data chunk 152 has completed, the second CQ update and the second SQ fetch are performed after the data memory access to the second data chunk 154 has completed, and the third CQ update and the third SQ fetch are performed after the data memory access to the third data chunk 156 has completed.

In an exemplary embodiment of the inventive concept, to re-order the data memory access and the non-data memory access, the scheduler 260 includes, as illustrated in FIG. 4, a data memory access queue 262 that stores data memory access packets DMAP for data memory accesses that are received from the DMA unit 255, and a non-data memory access queue 264 that stores non-data memory access packets NDMAP for the non-data memory accesses that are received from the SQ fetch unit 251, the CQ update unit 252 and the PRP fetch unit 253. In an exemplary embodiment, to re-order the data memory access and the non-data memory access such that the non-data memory access is performed after the data memory access to each data chunk 152, 154 and 156 has completed, the scheduler 260 stops outputting the non-data memory access packets NDMAP from the non-data memory access queue 264 and outputs only the data memory access packets DMAP from the data memory access queue 262 until the data memory access to the each data chunk 152, 154 and 156 has completed. Accordingly, since the data memory access to a data chunk that is successive data is continuously performed without interruption, a hit ratio of a row buffer that serves as a cache of the host memory 130 may be improved.

Figure 6:
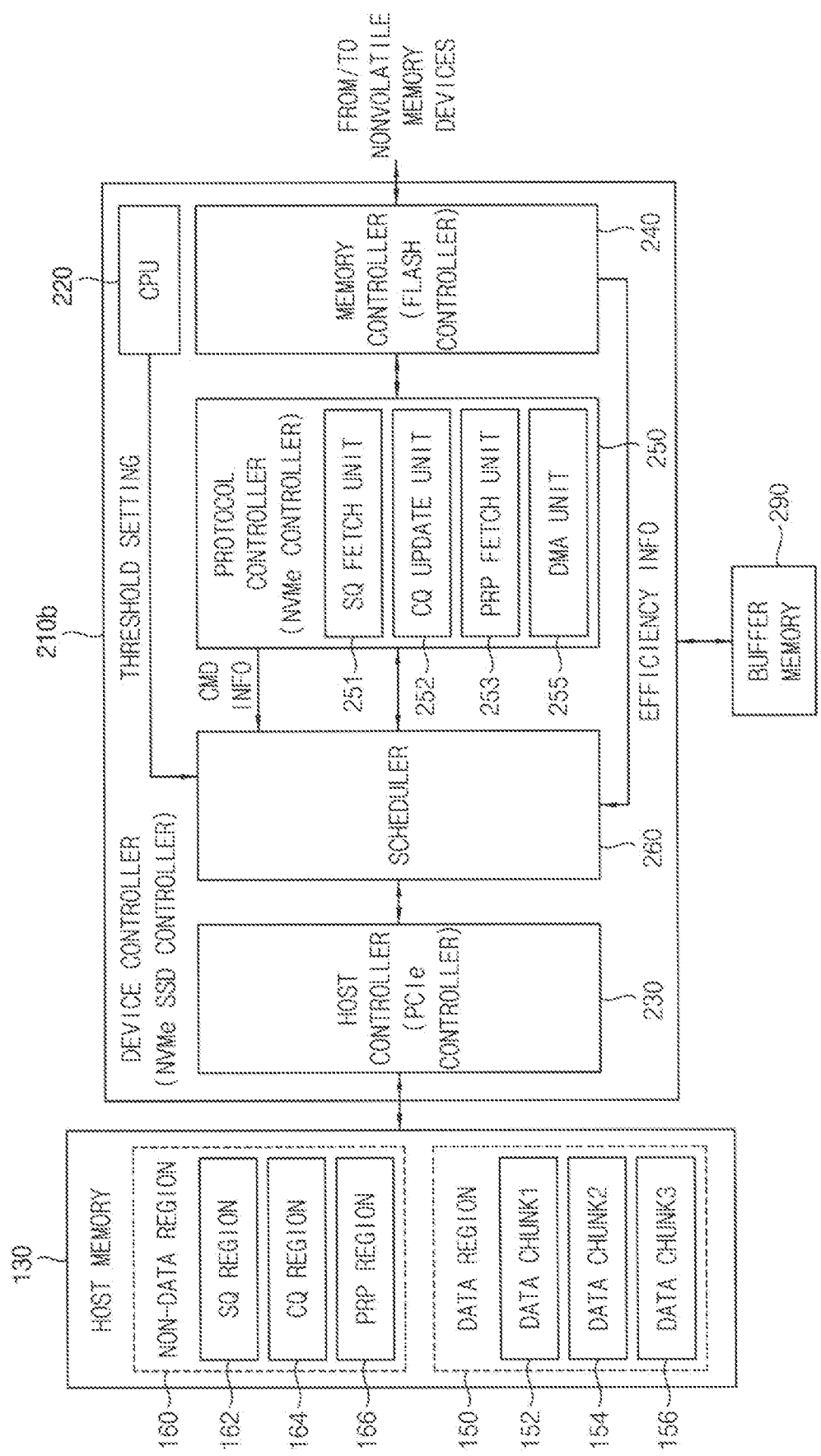
FIG. 6 is a block diagram illustrating a device controller of a storage device according to an exemplary embodiment of the inventive concept.
Figure 7:
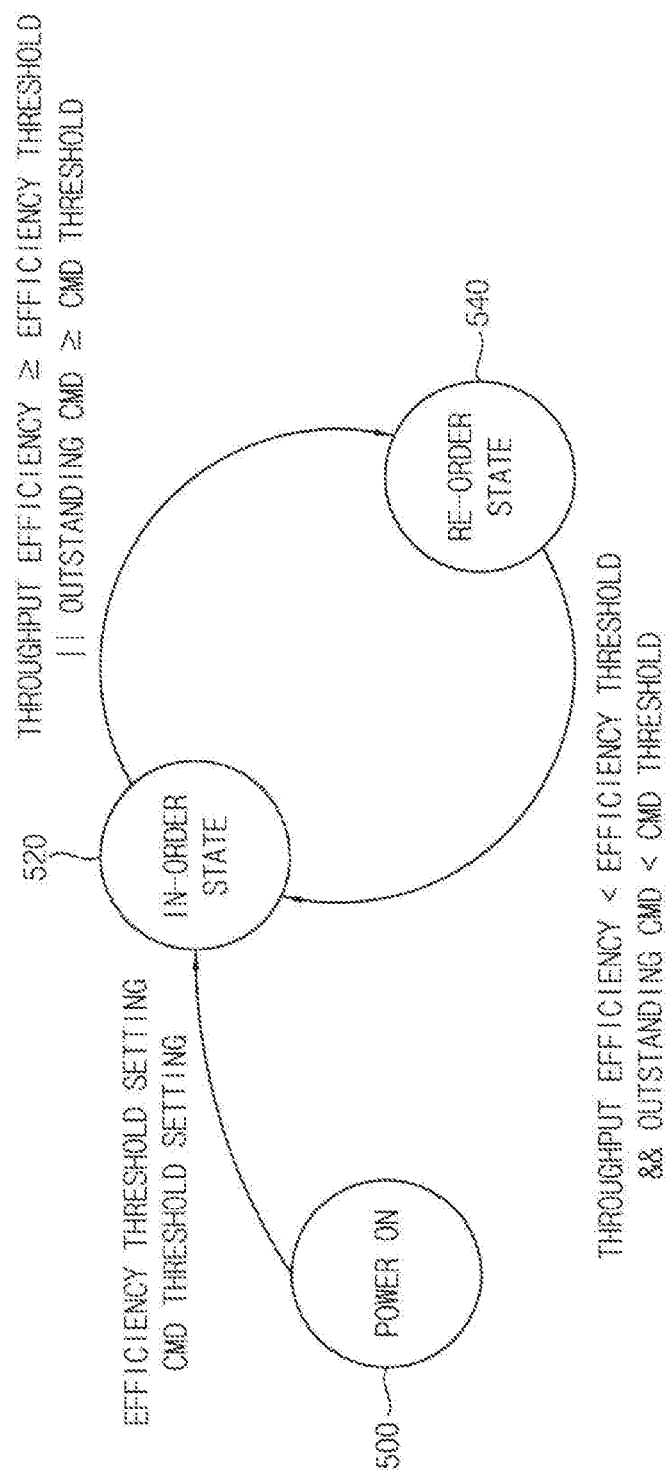
FIG. 7 is a state diagram of a scheduler included in a device controller according to an exemplary embodiment of the inventive concept.

FIG. 6 is a block diagram illustrating a device controller of a storage device according to an exemplary embodiment of the inventive concept. FIG. 7 is a state diagram of a scheduler included in a device controller according to an exemplary embodiment of the inventive concept.

A device controller 210b of FIG. 6 has a similar configuration and a similar operation to a device controller 210a of FIG. 3, except that the device controller 210b selectively performs re-ordering of data memory access and non-data memory access.

Referring to FIG. 6, a scheduler 260 of the device controller 210b receives command information from a protocol controller 250, and/or receives efficiency information from a memory controller 240. The scheduler 260 selectively performs the re-ordering of the data memory access and the non-data memory access based on the command information from the protocol controller 250 and/or the efficiency information from the memory controller 240.

In an exemplary embodiment of the inventive concept, the scheduler 260 receives the command information representing the number of outstanding commands from the protocol controller 250, and selectively performs the re-ordering of the data memory access and the non-data memory access according to whether the number of outstanding commands is greater than or equal to a command threshold value. For example, if the number of outstanding commands is less than the command threshold value, the scheduler 260 does not perform the re-ordering, and the device controller 210b may immediately perform the non-data memory access, thereby improving throughput efficiency of a storage device.

Further, if the number of outstanding commands is greater than or equal to the command threshold value, the scheduler 260 performs the re-ordering, thereby improving a hit ratio of a row buffer of a host memory 130. In an embodiment, the outstanding commands are the commands that have not yet been executed. In an exemplary embodiment of the inventive concept, the command threshold value is set by the CPU 220.

In an exemplary embodiment of the inventive concept, the scheduler 260 receives the efficiency information representing throughput efficiency of a plurality of nonvolatile memory devices from the memory controller 240, and may selectively performs the re-ordering of the data memory access and the non-data memory access according to whether the throughput efficiency of the plurality of nonvolatile memory devices is greater than or equal to an efficiency threshold value. In an embodiment, the throughput efficiency of the plurality of nonvolatile memory devices is a ratio of the number of running nonvolatile memory devices (or nonvolatile memory devices performing data read/write operations) to the total number of the plurality of nonvolatile memory devices, or a ratio of a current amount of data transferred to the maximum amount of data that can be transferred through memory channels between the memory controller 240 and the plurality of nonvolatile memory devices. For example, if the throughput efficiency of the plurality of nonvolatile memory devices is less than the efficiency threshold value, the scheduler 260 does not perform the re-ordering, and the device controller 210b may immediately perform the non-data memory access, thereby increasing the throughput efficiency of the storage device. Further, if the throughput efficiency of the plurality of nonvolatile memory devices is greater than or equal to the efficiency threshold value, the scheduler 260 performs the re-ordering, thereby improving the hit ratio of the row buffer of the host memory 130. In an exemplary embodiment of the inventive concept, the efficiency threshold value is set by the CPU 220.

In an exemplary embodiment of the inventive concept, the scheduler 260 receives the command information from the protocol controller 250, receives the efficiency information from the memory controller 240, and selectively performs the re-ordering of the data memory access and the non-data memory access based on the command information and the efficiency information. For example, as illustrated in FIG. 7, once the device controller 210b is powered on 500, the CPU 220 may set the command threshold value and the efficiency threshold value of the scheduler 260. In an exemplary embodiment of the inventive concept, after the command threshold value and the efficiency threshold value are set, the scheduler 260 operates in an in-order state 520 where the scheduler 260 does not perform the re-ordering of the data memory access and the non-data memory access. While operating in the in-order state 520, if the number of outstanding commands becomes greater than or equal to the command threshold value, or if the throughput efficiency of the plurality of nonvolatile memory devices becomes greater than or equal to the efficiency threshold value, the scheduler 260 transitions to a re-order state 540 where the scheduler 260 performs the re-ordering of the data memory access and the non-data memory access. Further, while operating in the re-order state 540, if the number of outstanding commands becomes less than the command threshold value, and if the throughput efficiency of the plurality of nonvolatile memory devices becomes less than the efficiency threshold value, the scheduler 260 transitions again to the in-order state 520. Accordingly, the device controller 210b according to at least one exemplary embodiment of the inventive concept improves the hit ratio of the row buffer of the host memory 130 while maintaining the throughput efficiency of the storage device.

Figure 8:
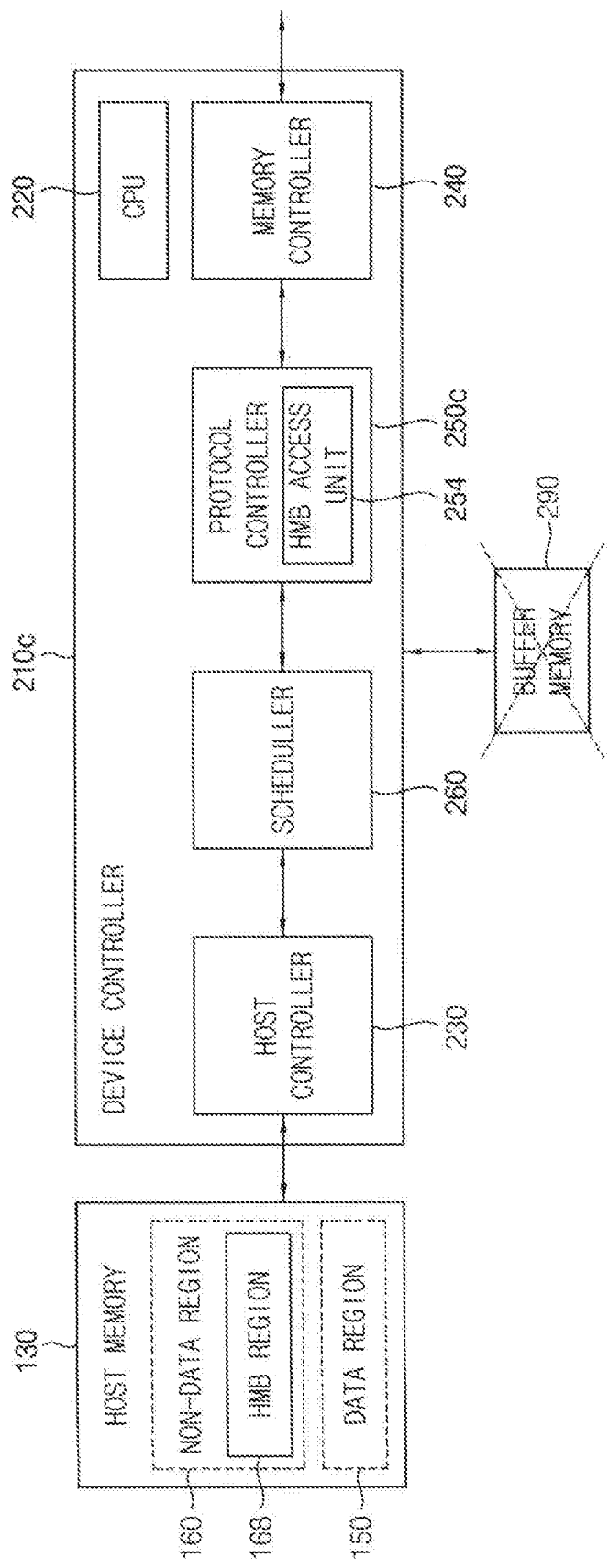
FIG. 8 is a block diagram illustrating a device controller of a storage device according to an exemplary embodiment of the inventive concept.

FIG. 8 is a block diagram illustrating a device controller of a storage device according to an exemplary embodiment of the inventive concept.

A device controller 210c of FIG. 8 has a similar configuration and a similar operation to a device controller 210a of FIG. 3 or a device controller 210b of FIG. 6, except that a protocol controller 250c further includes a HMB access unit 254 (e.g., a circuit).

Referring to FIG. 8, the protocol controller 250c of the device controller 210c further includes the HMB access unit 254 as well as an SQ fetch unit, a CQ update unit and a PRP fetch unit. The HMB access unit 254 performs, as a non-data memory access, an HMB access that accesses a HMB region 168 allocated within a non-data region 160 of a host memory 130 for dedicated use by the device controller 210c. For example, the device controller 210c may manage a logical-to-physical (L2P) map in the HMB region 168. In this case, a storage device including the device controller 210c may be implemented without a buffer memory 290. The L2P map may include a plurality of entries, where each entry includes a logical address and a corresponding physical address within the nonvolatile memory devices.

The present inventive concept may be applied to any storage device. For example, the present inventive concept may be applied to an SSD, an NVMe SSD, Z-SSD, an Optane SSD, a multi-level cell (MLC)-based SSD, a triple level cell (TLC)-based SSD, or a hard disk drive (HDD).

The foregoing is illustrative of exemplary embodiments of the inventive concept and is not to be construed as limiting thereof. Although a few exemplary embodiments have been described, those skilled in the art will readily appreciate that many modifications are possible in the exemplary embodiments without materially departing from the present inventive concept. Accordingly, all such modifications are intended to be included within the scope of the present inventive concept.

What is claimed is:

1. A device controller included in a storage device, the device controller comprising:
    a host controller connected to a host memory, and configured to communicate with the host memory;
    a memory controller connected to a plurality of nonvolatile memory devices, and configured to communicate with the plurality of nonvolatile memory devices;
    a protocol controller configured to control data transfer between the host controller and the plurality of nonvolatile memory devices, and to perform data memory accesses to a data region of the host memory and a non-data memory access to a non-data region of the host memory through the host controller; and
    a scheduler configured to re-order the data memory accesses and the non-data memory access such that the data memory accesses to data chunk of the data region are completed before the non-data memory access is performed when the non-data memory access is initially scheduled to be performed between the data memory accesses, the data chunk being successive data that is allocated within the data region by a physical region page (PRP).

2. The device controller of claim 1, wherein the scheduler includes a data memory access queue configured to store data memory access packets for the data memory accesses, and a non-data memory access queue configured to store non-data memory access packets for the non-data memory access, and wherein, to re-order the data memory accesses and the non-data memory access, the scheduler outputs the data memory access packets from the data memory access queue and stops outputting the non-data memory access packets from the non-data memory access queue until the data memory accesses to the data chunk have completed.

3. The device controller of claim 1, wherein the scheduler selectively performs the re-ordering of the data memory accesses and the non-data memory access according to a number of outstanding commands.

4. The device controller of claim 1, wherein the scheduler selectively performs the re-ordering of the data memory accesses and the non-data memory access according to a throughput efficiency of the plurality of nonvolatile memory devices.

5. The device controller of claim 1, wherein the scheduler receives information about a number of outstanding commands from the protocol controller, and receives information about throughput efficiency of the plurality of nonvolatile memory devices from the memory controller, and wherein the scheduler performs the re-ordering of the data memory accesses and the non-data memory access when the number of the outstanding commands is greater than or equal to a command threshold value or when the throughput efficiency of the plurality of nonvolatile memory devices is greater than or equal to an efficiency threshold value.

6. The device controller of claim 1, wherein the non-data memory accesses include at least one of a submission queue (SQ) fetch, a PRP fetch and a completion queue (CQ) update.

7. The device controller of claim 6, wherein the non-data memory accesses further include a host memory buffer (HMB) access.

8. The device controller of claim 1, wherein the protocol controller comprises:
    a direct memory access (DMA) unit configured to perform at least one of the data memory accesses;
    an SQ fetch unit configured to perform an SQ fetch as the non-data memory access;
    a PRP fetch unit configured to perform a PRP fetch as the non-data memory access; and
    a CQ update unit configured to perform a CQ update as the non-data memory access.

9. The device controller of claim 8, wherein the protocol controller comprises: an HMB access unit configured to perform an HMB access as the non-data memory access.

10. The device controller of claim 1, wherein the protocol controller is a nonvolatile memory express (NVMe) controller.

11. A device controller included in a storage device, the device controller comprising:
    a host controller connected to a host memory, and configured to communicate with the host memory;
    a memory controller connected to a plurality of nonvolatile memory devices, and configured to communicate with the plurality of nonvolatile memory devices;
    a protocol controller configured to control data transfer between the host controller and the plurality of nonvolatile memory devices, and to perform a data memory access to a data region of the host memory and a non-data memory access to a non-data region of the host memory through the host controller; and
    a scheduler configured to selectively perform re-ordering of the data memory access and the non-data memory access according to a number of outstanding commands and a throughput efficiency of the plurality of nonvolatile memory devices.

12. The device controller of claim 11, wherein the scheduler receives information about the number of the outstanding commands from the protocol controller, and wherein the scheduler performs the re-ordering of the data memory access and the non-data memory access when the number of the outstanding commands is greater than or equal to a command threshold value.

13. The device controller of claim 11, wherein the scheduler receives information about the throughput efficiency of the plurality of nonvolatile memory devices from the memory controller, and wherein the scheduler performs the re-ordering of the data memory access and the non-data memory access when the throughput efficiency of the plurality of nonvolatile memory devices is greater than or equal to an efficiency threshold value.

14. The device controller of claim 11, wherein the scheduler receives information about the number of the outstanding commands from the protocol controller, and receives information about the throughput efficiency of the plurality of nonvolatile memory devices from the memory controller, and wherein the scheduler performs the re-ordering of the data memory access and the non-data memory access when the number of the outstanding commands is greater than or equal to a command threshold value or when the throughput efficiency of the plurality of nonvolatile memory devices is greater than or equal to an efficiency threshold value.

15. The device controller of claim 14, further comprising: a central processing unit (CPU) configured to control an operation of the device controller, wherein the command threshold value and the efficiency threshold value of the scheduler is set by the CPU.

16. The device controller of claim 11, wherein the data memory access and the non-data memory access are re-ordered such that the non-data memory access to the non-data region is performed after the data memory access to a data chunk has completed, and the data chunk is successive data that is allocated within the data region by a physical region page.

17. A storage device comprising:
a plurality of nonvolatile memory devices; and
a device controller configured to control the plurality of nonvolatile memory devices, wherein the device controller comprises:
a host controller connected to a host memory, and configured to communicate with the host memory;
a memory controller connected to the plurality of nonvolatile memory devices, and configured to communicate with the plurality of nonvolatile memory devices;
a protocol controller configured to control data transfer between the host controller and the plurality of nonvolatile memory devices, and to perform data memory accesses to a data chunk of a data region of the host memory and a non-data memory access to a non-data region of the host memory through the host controller; and
a scheduler configured to re-order the data memory accesses and the non-data memory access such that the data memory accesses to a data chunk of the data region are completed before the non-data memory access is performed when the non-data memory access is initially scheduled to be performed between the data memory accesses, the data chunk being successive data that is allocated within the data region by a physical region page (PRP).

18. The storage device of claim 17, wherein the scheduler comprises a data memory access queue configured to store data memory access packets for the data memory accesses, and a non-data memory access queue configured to store non-data memory access packets for the non-data memory access, and wherein, to re-order the data memory accesses and the non-data memory access, the scheduler outputs the data memory access packets from the data memory access queue and stops outputting the non-data memory access packets from the non-data memory access queue until the data memory accesses to the data chunk have completed.

19. The storage device of claim 17, wherein the scheduler selectively performs the re-ordering of the data memory accesses and the non-data memory access according to a number of outstanding commands.

20. The storage device of claim 17, wherein the scheduler selectively performs the re-ordering of the data memory accesses and the non-data memory access according to a throughput efficiency of the plurality of nonvolatile memory devices.

* * * * *